United States Patent
Krull (10) Patent No.: US 11,958,007 B2
(45) Date of Patent: Apr. 16, 2024

(54) FILTER ELEMENT

(71) Applicant: Parker-Hannifin Corporation, Cleveland, OH (US)

(72) Inventor: Timothy L. Krull, Kearney, NE (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 18/116,604

(22) Filed: Mar. 2, 2023

(65) Prior Publication Data

US 2023/0211267 A1  Jul. 6, 2023

Related U.S. Application Data

(63) Continuation of application No. PCT/US2021/052197, filed on Sep. 27, 2021.
(Continued)

(51) Int. Cl.
*B01D 46/00* (2022.01)
*B01D 46/10* (2006.01)
*B01D 46/52* (2006.01)

(52) U.S. Cl.
CPC ..... *B01D 46/0004* (2013.01); *B01D 46/0001* (2013.01); *B01D 46/10* (2013.01);
(Continued)

(58) Field of Classification Search
CPC ............ B01D 46/0001; B01D 46/0004; B01D 46/10; B01D 46/521; B01D 2265/028;
(Continued)

(56) References Cited

U.S. PATENT DOCUMENTS 5,620,505 A * 4/1997 Koch ................. B01D 46/0036
                                                    55/497
6,045,598 A * 4/2000 Fath ..................... B01D 29/012
                                                    55/497
(Continued)

FOREIGN PATENT DOCUMENTS

DE       1776236 A1   10/1974
WO   WO 2020/026179 A2   2/2020

OTHER PUBLICATIONS https://www.baldwinfilters.com/content/dam/Parker-com/Literature/EMAM/EMAM_Baldwin_EnduraCube_Advanced_Technology_In_Air_Flitration_Form636.pdf; known prior to Sep. 29, 2020.

*Primary Examiner* — Minh Chau T Pham
(74) *Attorney, Agent, or Firm* — Reinhart Boerner Van Deuren P.C.

(57) ABSTRACT

A filter element includes a frame having an outlet panel and two side panels defining a U-shape. A U-shaped media anchor channel extends along the distal side edge of each panel. Each media anchor channel can have a snap-tab or other locking feature. The element encloses a pleated panel filter media pack having a side edge along each side of the pack. Each side edge of the media pack is located in a media anchor channel, and a bead of adhesive is applied along the channel. A pair of seal bars, each having a u-shape and a snap-tab or other feature that cooperates with the u-shape and the snap-tab of each media anchor channel, is pressed into each channel. Each seal bar mechanically retains a respective media side edge in the channel and together with the adhesive, provides a consistent, robust seal between the media and the frame.

22 Claims, 6 Drawing Sheets

Related U.S. Application Data (60) Provisional application No. 63/124,931, filed on Dec. 14, 2002, provisional application No. 63/084,588, filed on Sep. 29, 2020.

(52) U.S. Cl.
CPC ...... *B01D 46/521* (2013.01); *B01D 2265/021* (2013.01); *B01D 2265/028* (2013.01); *B01D 2265/04* (2013.01); *B01D 2265/06* (2013.01); *B01D 2271/02* (2013.01)

(58) Field of Classification Search
CPC ............ B01D 2265/04; B01D 2271/02; B01D 2271/06
USPC ................. 55/490, 497, 498, 502, 504, 521, 55/DIG. 31; 210/435
See application file for complete search history.

(56) References Cited

U.S. PATENT DOCUMENTS

| | | | | |
|---|---|---|---|---|
| 6,159,260 | A * | 12/2000 | Hammes | B01D 46/10 55/497 |
| 7,396,376 | B2 * | 7/2008 | Schrage | B01D 46/527 55/482 |
| 10,279,424 | B2 * | 5/2019 | Sudermann | B23K 26/048 |
| 10,357,731 | B2 | 7/2019 | Von Seggern et al. | |
| 11,020,701 | B2 * | 6/2021 | Schmid | B01D 46/521 |
| 2005/0166561 | A1 | 8/2005 | Schrage et al. | |
| 2007/0289273 | A1 | 12/2007 | Boyd | |
| 2010/0126129 | A1 | 5/2010 | Kim et al. | |
| 2014/0318090 | A1 * | 10/2014 | Rieger | F02M 35/02491 55/495 |
| 2020/0072169 | A1 | 3/2020 | Ehrenberg et al. | |

\* cited by examiner

FILTER ELEMENT

CROSS-REFERENCE TO RELATED PATENT APPLICATIONS

This patent application is a continuation of U.S. PCT Patent Application No. PCT/US2021/052197, filed Sep. 27, 2021, which is now pending, which claims the benefit of U.S. Provisional Patent Application No. 63/124,931, filed Dec. 14, 2020, and claims the benefit of U.S. Provisional Patent Application No. 63/084,588, filed Sep. 29, 2020, the entire teachings and disclosure each of which are incorporated herein by reference thereto.

TECHNICAL FIELD

The present invention relates to a filter element for use in an air filter assembly.

BACKGROUND

Air filter assemblies are used in automotive and industrial applications for the purpose of filtering air for use in downstream systems. Unfiltered fluids, such as air, entering a system often contain contaminants and particulates that may be harmful, or at least inefficient, for use by downstream components and machinery. Thus, it can be important to filter as much of the contaminants and particulate matter out of the air stream as possible.

Filters or filter elements are typically mounted in the filter housings of the air filter assemblies and define the flow path of the air stream through the housing. Inlet air enters an upstream end of the filter element and exits at an opposing, downstream end. The filter elements support a filter media pack, such as a pleated panel filter, within a shell or frame. As the inlet air passes through the filter media pack, the filter media removes or at least reduces the contaminants and particulates in the air. After a period of use, the filter media typically becomes spent or saturated, which usually then requires removal of the filter element for cleaning or replacement.

As a removable element, the filter element is known to have a gasket or seal at its downstream end to create an air-tight seal between the filter element and the outlet of the housing of the filter assembly. Such a seal is important to prevent unfiltered air from leaking around or bypassing the filter element and thus entering the downstream system without having passed through the media. Such a seal can be provided as a separate gasket supported and/or adhesively fixed within a channel at the outer end of the frame of the filter element, and/or as a form-in-place urethane component around the outer end of the element. Due to the location of the downstream seal, the structure of the frame of the filter element, and the available volume within the housing of the filter assembly, the downstream seal is relatively easy to create and apply to the pack to provide an appropriate seal against the housing.

Filter elements are also known to have seals between the filter media pack and the frame of the filter element. If the filter media is not sealed within the filter element, the same issue of unfiltered air leaking or bypassing around the filter media and into the downstream system can occur. The seals within the filter element assembly can be more of a challenge to create than the seal between the element and the housing, as there is limited space within the frame of the element, and the location of the seal adjacent the frame can reduce the effective flow area through the media.

One technique has been to use adhesive to seal the edges of the filter media to the frame of the filter media pack. The adhesive seal can require a complicated frame structure, specialized dispensing equipment, and can be a challenge to replicate so that an effective seal is provided around the entire frame. The adhesive seal also often needs to be fixtured in position while the adhesive cures—which can result in slower manufacturing rates.

As such, it is believed there is a need for a filter element with an improved sealing structure between the filter media and the frame of the filter element, particularly at the upstream end of the media pack, which provides a consistent, robust seal around the frame of the filter element, and reduces the manufacturing time and complexity associated with the filter element.

SUMMARY

A novel filter element is provided having an improved sealing structure between the filter media and the frame of the filter element, which is particularly advantageous at the upstream end of the filter element. The improved sealing structure combines adhesive and mechanical retention techniques, and as such, provides a consistent, robust seal around the entire frame of the filter element, and which reduces the manufacturing time and complexity associated with the filter element.

In one example, the filter element includes a pleated panel filter media supported within a frame. The frame has an outlet panel at its downstream end with cross-brace ribbing. The cross-brace ribbing at the outlet secures and supports the filter media in place, preventing the filter media from protruding through the outlet and protecting the media from damage caused by deformation, while allowing outlet air to pass through the pleated media and through the ribbing. The outlet panel also has a gasket attachment surface around the perimeter of the outlet face of the outlet panel. A gasket is attached to the gasket attachment surface to provide an air-tight seal against the outlet of the housing of the filter assembly.

The frame further has two solid side panels attached along opposite side edges of the outlet panel, supporting the sides of the filter media. The panels can be hingedly secured to the outlet panel to facilitate assembling the filter element and extend substantially perpendicular to the outlet face of the outlet panel to form a U-shaped structure supporting the sides of the media.

The distal side edge of one, and preferably both panels of the frame, has an outwardly-facing, substantially U-shaped channel in cross-section. The U-shaped channel defines a media anchor channel for a seal bar. The anchor channel includes parallel inner and outer side walls, and an end wall. In one example, the inner wall of the media anchor channel can extend flush with the remainder of the side panel. The channel preferably extends along the entire side edge of each panel from one end of the panel to the other. The outer wall of the anchor channel can include a snap-fit tab or other locking geometry or structure on its outer surface.

A seal bar is located in at least one of the media anchor channels. In one example, the filter element includes a U-shaped channel on the distal side edge of each side panel, and a seal bar is located in each media anchor channel. The seal bars are preferably preformed and are substantially U-shaped in cross-section—also with parallel side walls and an end wall forming a channel. The seal bar is inverted and inserted into the media anchor channel with one of the side walls of the seal bar closely received between the side walls of the media anchor channel, and the other of the walls received exteriorly of the outer side wall of the media anchor channel. The shape of the seal bar cooperates with the shape of the media anchor channel to retain the seal bar within the channel. Preferably the seal bar and media anchor channel can interlock with one-another when attached. In one example, the inner surface of the outer wall of the seal bar can have a snap-fit tab or other locking geometry or structure for interengaging the snap-fit tab or other locking geometry or structure of the media anchor channel.

Before the seal bar is attached to the media anchor channel, a side edge of the pleated panel filter media is located at least partially within the channel. A bead of adhesive is applied along the channel either before or after the side edge of the media is located in the channel. The seal bar is then pressed into the media anchor channel with the adhesive retaining the seal bar and side edge of the media within the media anchor channel. The attachment of the seal bar to the media anchor channel captures the media side edge and sealingly secures the edge between the seal bar and the channel. The interengagement of the snap-fit tabs on the channel and the seal bar mechanically retains the seal bar in position in the channel, so that the remainder of the assembly of the filter pack can progress while the adhesive cures.

The filter element further includes a pair of end caps. The end caps can be pre-formed of a plastic material and are potted to the side panels of the frame and the ends of the media with an adhesive, sealing the open ends of the pleated media. The end caps each have a short sidewall that receives the ends of the pleated media panels. The sealing bars preferably extend along the edges of the side panels into abutting, substantially flush relation with the sidewalls of the end caps. The side edges of the pleated media are thereby secured and sealed along the entire length of the side panels of the filter element.

One or both of the end caps may also have flexible removal loops that extend from the end caps and across a portion of the exterior surface of the side panels of the frame. The removal loops facilitate installing and removing the filter element from the housing of the filter assembly.

The filter element as describe above provides an air-tight seal between the filter media and the frame of the filter element at the upstream end of the filter element to ensure unfiltered air does not leak around or bypass the filter media, and to thus ensure contaminants and particulate are not carried by the air flow to downstream components. The seal bars create a sealed interface that is held together by mechanical and adhesive means, thus improving the reliability of the sealed interface. Further, the design simplifies the manufacturing process and increases the manufacturing speed. Overall, an improved sealing structure between the filter media and the frame of the filter element, particularly at the upstream end of the element, is provided which provides a consistent, robust seal, and which reduces manufacturing time and complexity associated with the filter element.

BRIEF DESCRIPTION OF THE DRAWINGS

Examples of the embodiment of this invention will now be described in further detail with reference to the accompanying drawings, in which.

DETAILED DESCRIPTION

Figure 1:
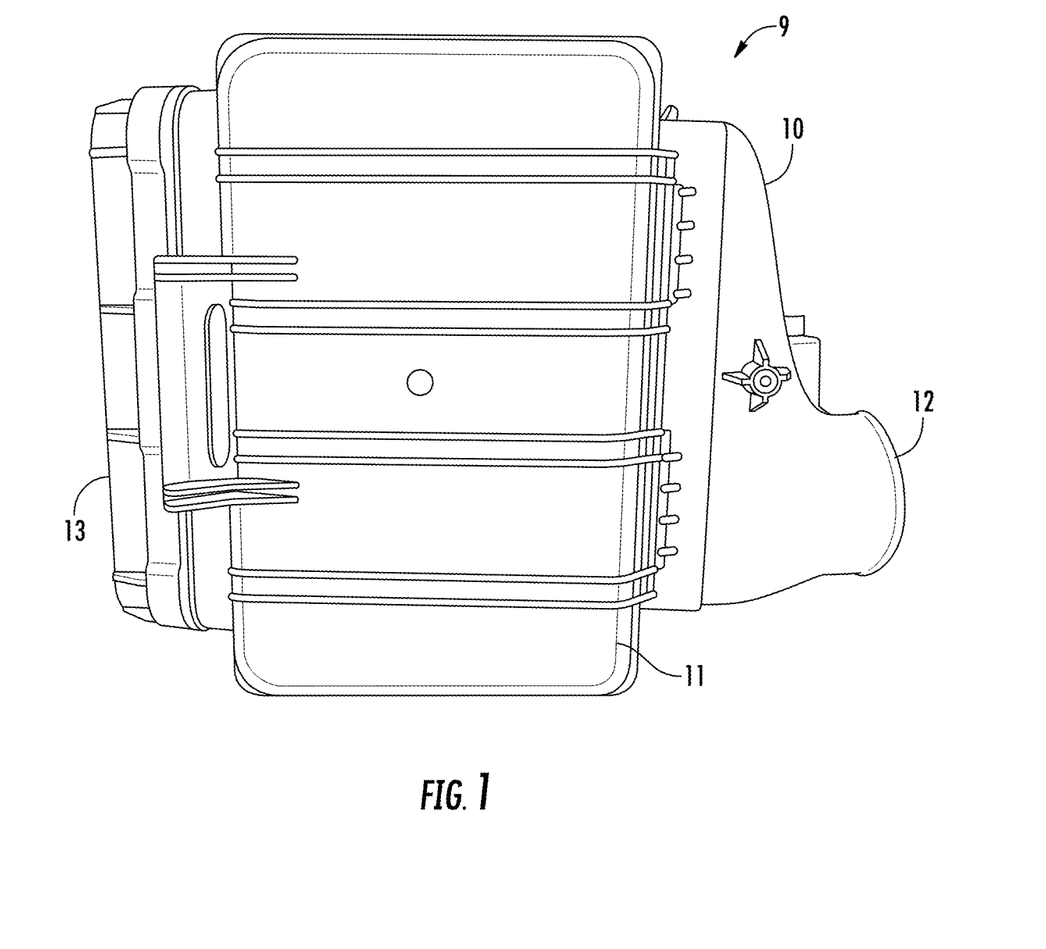
FIG. 1 is a side view of an air filter assembly for the filter element of the present invention.

Referring initially to FIG. 1, a side view of a filter assembly appropriate for a filter element of the present invention is indicated generally at 9. The filter assembly generally includes a housing 10 with a hinged cover 11, an air outlet 12 and an air inlet 13. The filter assembly is generally referred to as a "side entry" air filter, as a filter media pack is introduced into the side of the filter housing for use. While one specific example of an air filter housing is shown, it should be appreciated that such example is only for illustration purposes, and the filter element of the subject invention could be used with other housing configurations.

Figure 2:
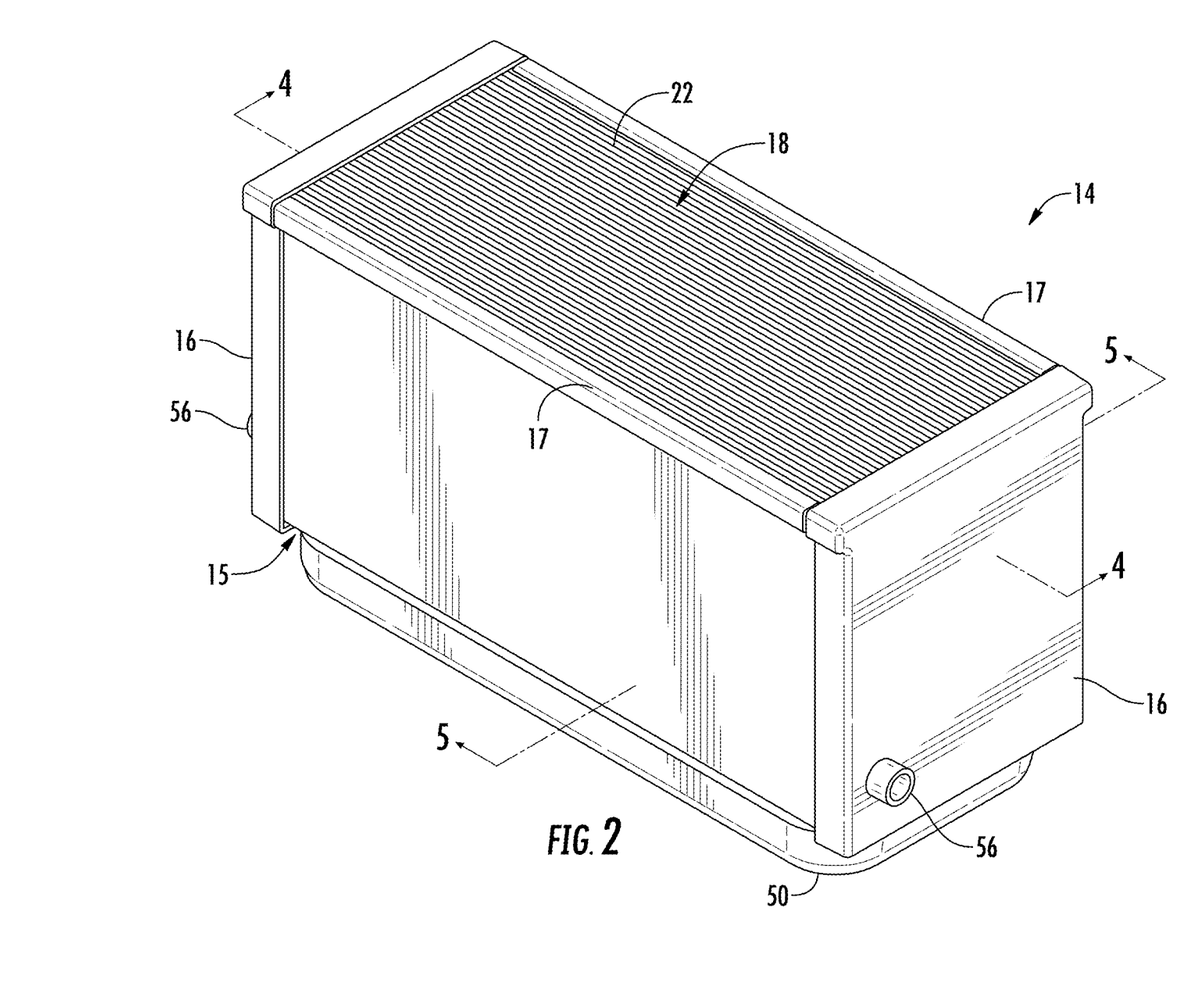
FIG. 2. is an elevated perspective view of one example of a filter element for the air filter assembly of FIG. 1.

Referring now to FIG. 2, a perspective illustration of one example of a filter element, indicated generally at 14, is shown, for the air filter housing of FIG. 1. The filter element 14 generally comprises a frame, indicated generally at 15, a pair of end caps 16, a pair of seal bars 17, and filter media, indicated generally at 18. The filter element 14 has a downstream outflow end 20 (FIG. 4) and an upstream inflow end 22, which in part define the airflow path through the filter element 14 and through the filter media 18.

Figure 3:
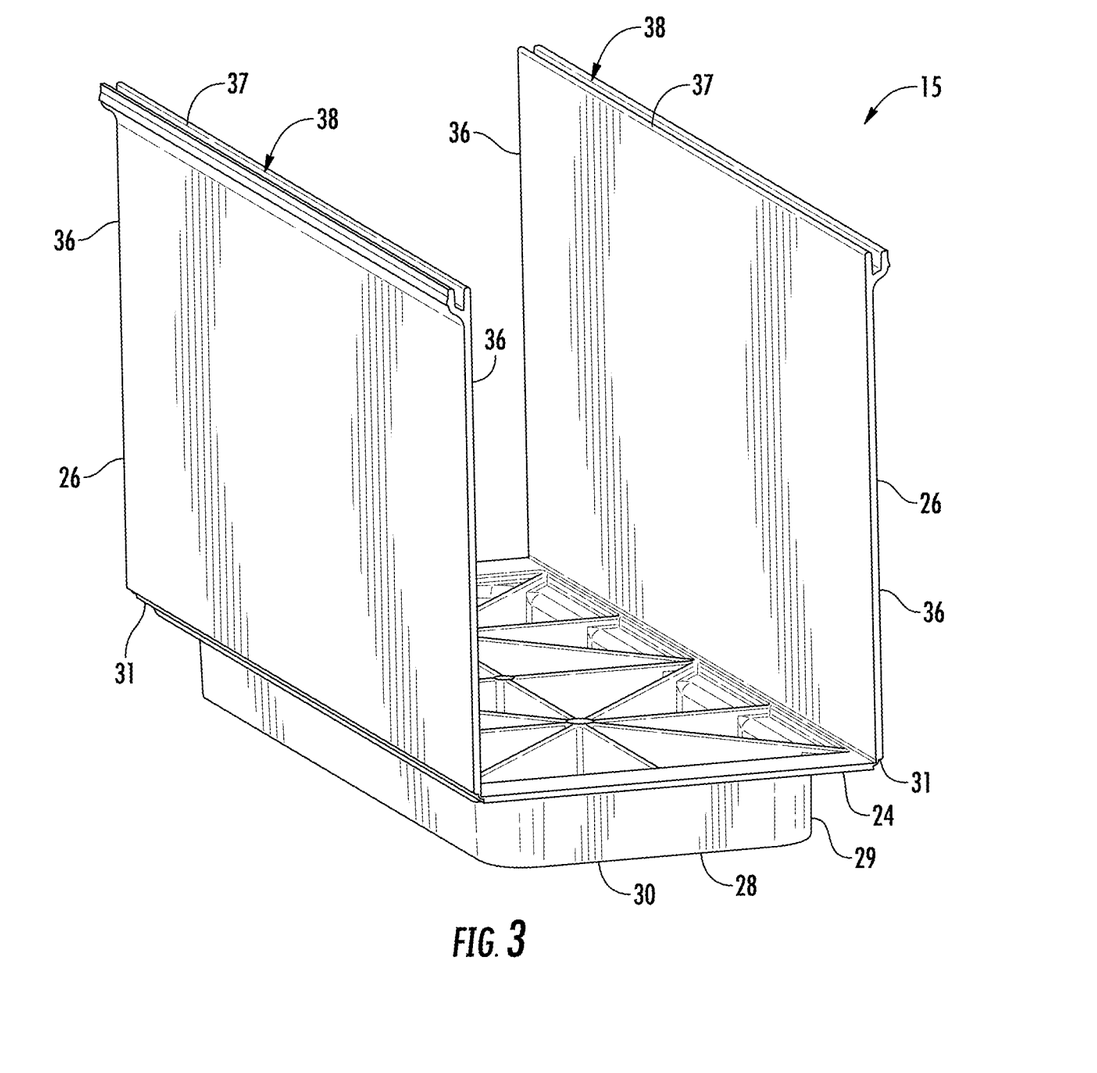
FIG. 3 is an elevated perspective view of the frame of the filter element of FIG. 2.

The frame 15 of the filter element 14 is shown in more detail in FIG. 3. The frame 15 comprises an outlet panel 24 and two solid side panels 26, preferably formed of plastic or other appropriate lightweight, inexpensive material. The outlet panel 24 defines the outflow end 20 of the filter element 14. In this example, the outlet panel 24 is substantially rectangular, although other geometries are possible. The outlet panel 24 has a cross-brace ribbing 28 that allows for the passage of air through the outlet panel 24 while also helping to secure and support the filter media in place and to prevent the filter media from protruding through the outlet panel 24 while also protecting the media from damage caused by deformation. The outlet panel 24 also has a gasket support section 29 with an outwardly-facing attachment surface 30. The gasket attachment surface 30 surrounds the cross-brace ribbing and is slightly inset from the outer perimeter of the outlet panel 24.

The side panels 26 in one example can have a rectangular configuration, with the inner edge of the panels 26 attached along the opposite side edges of the outlet panel 24. In this example, the side panels 26 are attached via a living (unitary) hinge 31 along the opposing side edges of the outlet panel 24. The living hinge 31 may have a reduced thickness relative to one or both of the outlet panel 24 and adjacent side panel 26. To facilitate assembly of the filter element, the panels can be folded flat, and the media located against the outlet panel 24. The side panels can then be folded up along the sides of the media. When the filter element 14 is fully assembled, the side panels 26 of the frame 15 extend substantially perpendicular to the outlet panel 24 and against the opposing sides of the media, as shown in FIG. 2 and FIG.

Figure 5:
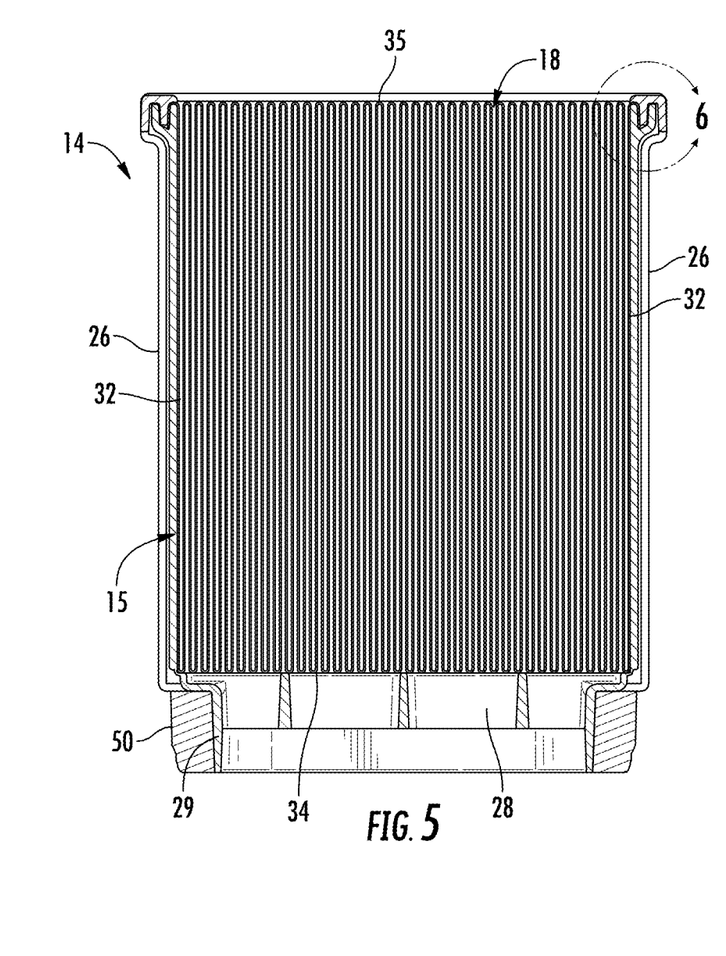
FIG. 5 is a cross-sectional end view of the filter element of FIG. 2, taken substantially along the plane defined by the lines 5-5 in FIG. 2.

5. Alternatively, the side panels could be rigidly fixed to the outlet panel forming a generally U-shaped configuration and the media can be slid between the side panels until the media is abutting the outlet panel 24. In this example, the side panels could be provided unitary with the outlet panel 24, such as being molded in one piece, or could be provided as separate components and fixed such as with adhesive or other appropriate techniques. In any event, when assembled, the frame 15 has a substantially U-shaped configuration. In one example, the side panels 26 are molded in a planar orientation relative to outlet panel 24 and then folded upward during the assembly process, e.g. after the filter media has been placed adjacent the outlet panel 24.

Figure 4:
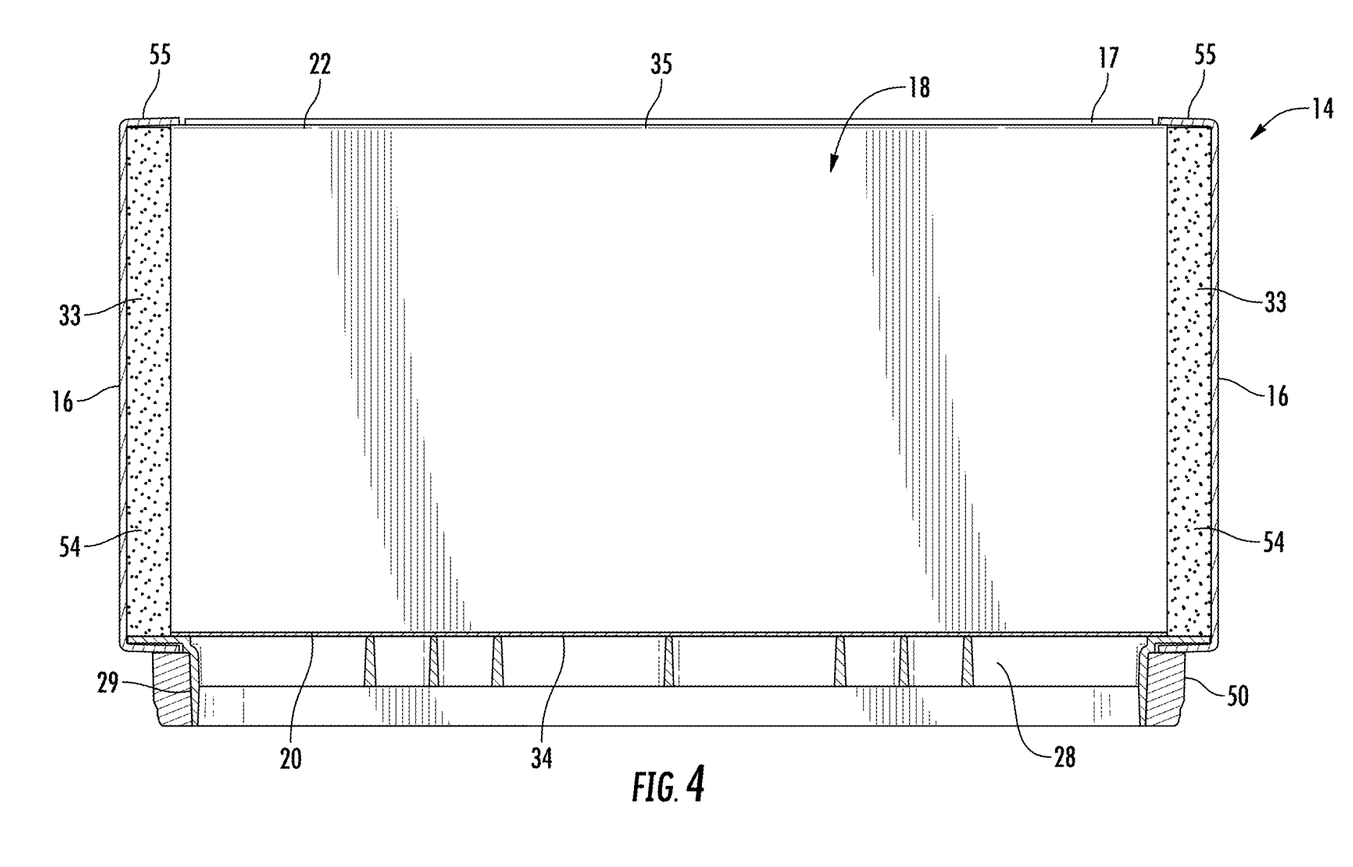
FIG. 4 is a cross-sectional side view of the filter element of FIG. 2, taken substantially along the plane defined by the lines 4-4 in FIG. 2.

The filter media 18 can be a panel-type filter media of cellulose, polymer or other media appropriate for the particular application, and can be assembled in one or more layers of material. The media can be pleated, such as being formed in a pleating machine to have a plurality of pleats located in adjacent, surface-to-surface relation with one another to form a tight rectangular pack, with parallel sides 32, parallel ends 33 and parallel upstream inlet and downstream outlet faces 35, 34, respectively, as shown in FIGS. 4 and 5. The media can be a single sheet of filter media folded to form a plurality of panels, a block of fluted media formed from a corrugated layer attached to a facer sheet, or other block-type media. One pleated panel media appropriate for the filter media pack is illustrated and described in U.S. Pat. No. 10,357,731, which is incorporated herein by reference. The packed pleats are located within the frame 15 with the outlet face 34 of the media preferably supported against the cross ribs 28 of the outlet panel 24, and with the flat outer side pleats 32 of the media supported by and against the side panels 26 of the frame. The ends 33 of the media are preferably flush with the end edges 36 (FIG. 3) of the panels 26, while the inlet face 35 is preferably flush with the distal side edges 37 of the panels 26. The pleats of the media thus extend parallel to the side panels 26 of the frame 15.

As shown in FIGS. 2 and 4-5, a preformed gasket 50 of urethane or other appropriate resilient material, surrounds and is attached, such as with adhesive, to the gasket attachment surface 30 of gasket support section 29. The gasket 50 promotes a secure and air-tight seal of the filter element 15 to the outlet of the filter assembly at the outflow end 20. Other forms and material for a seal at the downstream end of the filter element could be used, as should be apparent to one of ordinary skill in the art.

Figure 6:
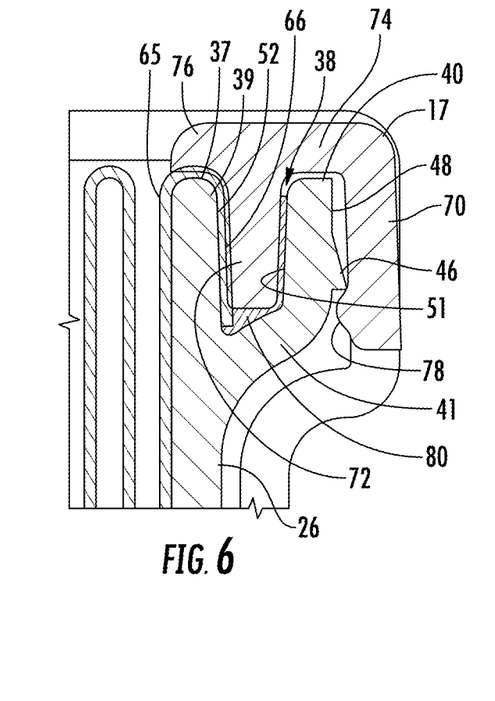
FIG. 6 is an enlarged cross-sectional end view of a portion of the filter element of FIG. 5.

Referring now to FIGS. 3 and 6, the side edge 37 of one, and preferably both side panels 26 has a substantially U-shaped end, defining a media anchor channel, indicated generally at 38. The media anchor channel has an interior rounded wall 39, parallel exterior wall 40 and inner or bottom end wall 41. In the present example, the interior wall 39 is flush with and forms the distal end of the side panel 26 of the frame 15. In other examples, the side panel 26 could be flush with the exterior wall 40 of the channel, or the panel could intersect the bottom wall 41 between the interior and exterior walls 39, 40. In any event, the media anchor channel 38 preferably extends the entire length of the side edge 37 of the panel from one end to the other.

At least one, and preferably both media anchor channels 38 can also have a snap-tab 46 located on an external surface 48 of the exterior wall 40 of the media anchor channel 38, the reason for which will be described more fully below. The snap-tab 46 extends along at least a portion, and preferably along the entire channel 38 from one end of the side panel to the other. In other examples, the snap-fit tab 46 may be located on the interior surface 51 of the external wall 40, and/or on the interior surface 52 of interior wall 39 of the media anchor channel 38.

Referring now to FIGS. 2 and 4, the end caps 16 of the media pack are each fixed to the frame 15 at the opposing open end faces 33 of the media. The end caps 16 can be formed from plastic or other appropriate lightweight, inexpensive material, and are potted with urethane 54 or other appropriate adhesive to promote a secure and air-tight seal on the frame 15 and against the ends of the filter media 18. As a result, air passing from the inflow end 22 of the filter element is forced to pass axially downstream through an open pleat end between adjacent pleats, laterally through a pleat of the media, and then axially downstream between other adjacent pleats through an open pleat at the outlet end 20 of the filter media 18, thus filtering the air.

Each end cap 16 can have short skirt portion as at 55 (FIG. 4), which receives the end of the media, and facilitates locating and securing the end cap to the media. Each end cap 16 can also have an outwardly-projecting end cap projection 56 (FIG. 2), which in one example, can be a cylindrical or annular projection. The end cap projections 56 serve as locating features when the filter element 14 is installed into the filter assembly. The filter assembly has a cooperative recess (not shown in FIG. 1) that locates and receives the end cap projection 56 to securely position and seal the filter media pack 14 within the filter assembly. The end cap projection 56 can have an appropriate geometry and can be located on the end cap 16 as appropriate for a particular design or application.

Referring again to FIG. 6, the outermost pleat 65 of the media located against each side panel 26 has a distal side edge 66 extending across the width of the media. The media side edge 66 is located so as to extend around and over the rounded end of the interior wall 39 of the media anchor channel 38 and at least partially into the media anchor channel 38. Preferably the media edge 66 extends along the interior surface 52 of the interior wall 39 to, or substantially to, the bottom wall 41 of the channel.

The side edges 66 of the media are secured and sealed to the frame 15. To this end, a bead or strip of adhesive 80 can be applied along the media anchor channel 38, either before or after the side edge 66 of the media is located in the channel. Subsequently, a seal bar 17 is pressed into each channel. Alternatively, the bead of adhesive could be applied to the seal bar before it is pressed into the channel. The seal bars 17 are each U-shaped in cross-section, and can be pre-formed from an appropriate material, such as plastic or other lightweight, inexpensive material. As can be seen, when inverted, the shape of the seal bar 17 compliments the shape of the media anchor channel 38 such that the seal bars can be pressed into and closely received in a respective media anchor channel. In this example, the seal bar 17 has a substantially U-shaped configuration, with an exterior side wall 70, a parallel interior side wall 72, and an end wall 74, defining a seal bar channel. A short flange 76 can extend laterally from the end wall 74 perpendicular to the side walls 70, 72, and across the end of the interior wall 39 of the media anchor channel 38. The flange 76 can have an inside surface substantially matching the rounded configuration of the end of the interior wall 39. The exterior side wall 70 can further include a snap-tab 78 extending along at least a portion, and preferably along the entire length of the wall, and toward the outer distal edge thereof.

With the side edge 66 of the filter media 18 received within the media anchor channel 38, the seal bar 17 is inverted, and forced into the media anchor channel 38 such that the u-shapes of the bar and the channel interlock. The interior wall 72 of the seal bar is closely received between the interior wall 39 and exterior wall 40 of the media anchor channel 38. The outer wall 70 of the seal bar is closely received along the outer wall 40 of the media anchor channel, such that the snap-tab 78 of the seal bar 17 engages the snap-tab 46 of the media anchor channel 38 to secure the seal bar within the channel. The side edge 66 of the media is captured between the inner wall 39 on the media anchor channel and inner wall 72 and flange 76 of the seal bar.

While both seal bars and channels are shown having a snap-tab engagement, it is possible such snap-tabs could be used with only one of the seal bar/channel engagements, with the media sealed to the frame along its other side using another technique; or that one or both of the seal bar/channel engagements could have other interengaging locking geometry or structure, such as ridges, tabs, or simply a friction or interference fit, to mechanically retain the seal bar(s) within the respective channel when assembled.

In other examples, the seal bar 17 may be received within the channel 38 such that the exterior wall 70 of the seal bar is received between the inner and outer walls 39, 40 of the channel 38, and the interior wall 72 of the seal bar located against an inner wall surface of the inner wall 39 of the media anchor channel. The snap-tabs 46, 78 could thereby be located on the interior surface 51 of the outer wall 40 on the media anchor channel 38, and the outer surface of the exterior wall 70 of the seal bar. Or the seal bar could have a T-shape or other configuration, such that only one wall of the seal bar is received within the media anchor channel 38, and the locking feature is located on one (or both) surfaces of the wall.

In any event, the seal bars 17 are each mechanically held within a media anchor channel 38, and extend along most if not the entire length of the media anchor channel 38 between the end caps 16, with the outer surface of the seal bars being substantially flush with the outer surface of the end edges of the end cap. Alternatively, the end caps 16 could be configured to receive the ends of the seal bars 17, with the seal bars thereby extending most if not all of the distance along the channel 38 between the ends 36 of the side panels.

The mechanical forces between the seal bar 17 and channel 38 retain the side edge 66 of the media within the media locking channel, and allow the adhesive 80 to cure and sealingly fix the media to the frame, without the use of specialized equipment and fixtures to hold the frame 15 and filter media 18 in place. The side edge 66 of the media is thus effectively and efficiently sealed along its entire length to the frame 15 within the media anchor channel 38 by the cooperation of the seal bar 17, the adhesive bead 80, and in at least some examples, the end caps 16. This advantageously allows other manufacturing steps to occur while the adhesive is curing, or at least movement of the filter element without concern of compromising the adhesive seal between the media and the frame of the filter element. This simplifies the manufacturing process and can increase the manufacturing speed and efficiency.

Again, as described previously, having such a sealed interface between the side edges of the media and frame of the element prevents unfiltered air from leaking or bypassing around the edges 66 of the filter media 18 and passing as a dirty air stream to downstream components.

Figure 7:
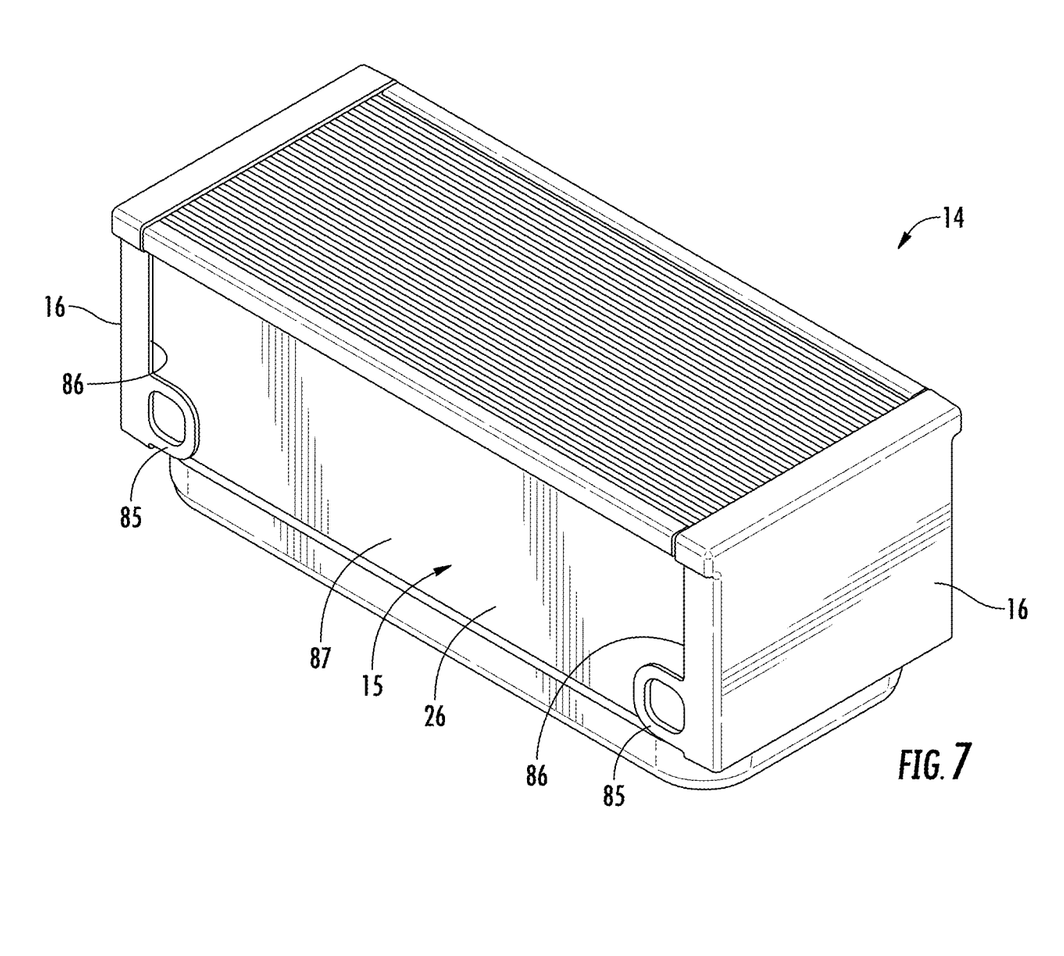
FIG. 7 is an elevated perspective view of another example of the filter element constructed according to the principles of the present invention.

Finally, as shown in FIG. 7, a further feature of the filter element 14 is illustrated, where the end caps 16 can also each have a flexible removal loop 85. The loops can be unitary with the end caps or formed separately and attached such as the potting compound used between the end caps and media. The flexible removal loops 85 extend from a side edge 86 of the end cap 16 and across a portion of the exterior surface 87 of one of the side panels 26 of the frame 15. The removal loops 85 can be grabbed by a user to facilitate the installation and removal of the filter element 14 from the filter housing.

As such, the filter element as describe above provides an air-tight seal between the filter media and the frame of the filter element, particularly at the upstream end of the filter element, to ensure unfiltered air does not leak around or bypass the filter media, and to thus ensure contaminants and particulate are not carried by the air flow to downstream components. A sealed interface is provided between the pleated media and the frame of the filter element that is created by both adhesive and mechanical forces, thus improving the reliability of the sealed interface. Overall, an improved upstream sealing structure between the filter media and the frame of the filter element is created which provides a consistent, robust seal, and which reduces manufacturing time and complexity associated with the filter element.

Although the principles, embodiments and operation of the present invention have been described in detail herein, this is not to be construed as being limited to the particular illustrative forms disclosed. It should be apparent to those skilled in the art that various modifications of the embodiments herein can be made without departing from the spirit or scope of the invention.

What is claimed is:

1. A filter element, comprising:
   a. a frame having an outlet panel and two side panels along opposite sides of the outlet panel, the side panels each having a U-shaped media anchor channel along a distal side edge of the respective side panel;
   b. filter media pack supported within the frame, the filter media pack including side edges along opposite sides of the media, each media side edge being at least partially received within a respective media anchor channel;
   c. a bead of adhesive along each media anchor channel for adhesively sealing the respective media side edge within the media anchor channel; and,
   d. two seal bars, each seal bar having a geometry that cooperates with a respective media anchor channel to mechanically retain the respective media side edge in the respective media anchor channel.

2. The filter element of claim 1, where the media anchor channel on each side of the frame has a snap-tab along the length of the media anchor channel.

3. The filter element of claim 2, where each of the seal bars has a snap-tab that cooperates with the snap-tab of a respective media anchor channel to mechanically retain the seal bar within the respective media anchor channel.

4. The filter element as in claim 3, wherein the snap-tab on each seal bar extends the length of the seal bar.

5. The filter element of claim 1, wherein each media anchor channel has an interior wall and parallel exterior wall, and the respective media side edge extends around and over the interior wall of the media anchor channel and at least partly into the respective media anchor channel.

6. The filter element of claim 1, further comprising a pair of end caps, each end cap fixed to a respective end of the frame such that each end cap seals against an associated end face of the filter media.

7. The filter element of claim 6, further including locking means within each media anchor channel for mechanically retaining a respective seal bar within the channel.

8. The filter element of claim 6, further including locking means on each seal bar for mechanically retaining the seal bar within a respective media anchor channel.

9. The filter element of claim 6, further including locking means associated with each channel and with each seal bar for mechanically retaining each seal bar within a respective media anchor channel.

10. The filter element of claim 6, further including locking means for mechanically retaining each seal bar within a respective media anchor channel.

11. The filter element as in claim 1, wherein each seal bar has a pair of walls defining a U-shaped configuration, with one of the walls of the seal bar closely received within the respective media anchor channel.

12. The filter element as in claim 11, wherein the bead of adhesive is located between the media anchor channel and the one wall of the seal bar.

13. The filter element of claim 1, where at least one of the end caps has a flexible removal loop extending from an edge of the end cap and across a portion of one of the side panels of the frame.

14. The filter element of claim 1, wherein the filter media pack includes a pleated panel filter media.

15. A filter element, comprising:
   a. a frame having a pair of side panels, at least one of the side panels having a media anchor channel along a distal side edge of the one side panel;
   b. filter media supported within the frame, the filter media including side edges along opposite sides of the media, one of the media side edges being at least partially received within the media anchor channel;
   c. adhesive means along the media anchor channel for adhesively sealing the media side edge within the media anchor channel; and,
   d. a seal bar having a configuration that cooperates with the media anchor channel to mechanically retain the media side edge in the media anchor channel.

16. The filter element of claim 15, further including locking means for mechanically retaining the seal bar within the media anchor channel.

17. The filter element of claim 16, wherein the media anchor channel has an interior wall and parallel exterior wall, and the media side edge extends around and over the interior wall of the media anchor channel and at least partly into the media anchor channel.

18. The filter element of claim 17, wherein the filter media is a pleated panel filter media.

19. The filter element of claim 18, further comprising a pair of end caps, each end cap fixed to a respective end of the frame such that each end cap seals against an associated end face of the filter media.

20. The filter element as in claim 19, wherein the seal bar has a pair of walls defining a U-shaped configuration, with one of the walls of the seal bar closely received within the media anchor channel.

21. The filter element as in claim 20, wherein the bead of adhesive is located between the media anchor channel and the one wall of the seal bar.

22. A method of assembling a filter element having a frame with an outlet panel and two side panels along opposite sides of the outlet panel, the side panels each having a U-shaped media anchor channel along a distal side edge of the respective side panel; a filter media pack including side edges along opposite sides of the filter media pack; and two seal bars, each seal bar having a geometry that can mechanically inter-engage with a geometry of a respective media anchor channel, comprising the steps of:
   a. locating the filter media pack in the frame and against the outlet panel, with the side panels of the frame along opposite side of the filter media pack, and such that the side edges of the filter media pack are each received within a respective media anchor channel;
   b. depositing a bead of adhesive along each media anchor channel; and
   c. locating each seal bar within a respective media anchor channel to mechanically retain the respective media side edge within the respective media anchor channel.

\* \* \* \* \*

UNITED STATES PATENT AND TRADEMARK OFFICE
CERTIFICATE OF CORRECTION

PATENT NO. : 11,958,007 B2
APPLICATION NO. : 18/116604
DATED : April 16, 2024
INVENTOR(S) : Timothy L. Krull Page 1 of 1

It is certified that error appears in the above-identified patent and that said Letters Patent is hereby corrected as shown below:

On the Title Page

Page 2, Related U.S. Application Data, Item (60) currently reads "Provisional application No. 63/124,931, filed on Dec. 14, 2002, provisional application No. 63/084,588, filed on Sep. 29, 2020."

Should correctly read --Provisional application No. 63/124,931, filed on Dec. 14, 2020, provisional application No. 63/084,588, filed on Sep. 29, 2020.--

Signed and Sealed this
Twenty-eighth Day of May, 2024

Katherine Kelly Vidal
*Director of the United States Patent and Trademark Office*